United States Patent [19]

Sakabe et al.

[11] Patent Number: 4,601,988
[45] Date of Patent: Jul. 22, 1986

[54] DIELECTRIC CERAMIC COMPOSITION

[75] Inventors: Yukio Sakabe, Funai; Goro Nishioka, Takatsuki; Junichi Imanari, Nagaokakyo, all of Japan

[73] Assignee: Murata Manufacturing Co., Ltd., Japan

[21] Appl. No.: 801,482

[22] Filed: Nov. 25, 1985

[30] Foreign Application Priority Data

Nov. 27, 1984 [JP] Japan ................................. 59-250796

[51] Int. Cl.$^4$ ............................................. C04B 35/46
[52] U.S. Cl. ................................................. 501/134
[58] Field of Search ........................ 501/134, 135, 136

[56] References Cited

U.S. PATENT DOCUMENTS 4,379,319  4/1983  Wilson ................................ 501/134
4,542,107  9/1985  Kato et al. ......................... 501/134

FOREIGN PATENT DOCUMENTS 55-7713   2/1980  Japan ................................ 501/136
59-196503 11/1984 Japan ................................ 501/136

Primary Examiner—Mark L. Bell
Attorney, Agent, or Firm—Ostrolenk, Faber, Gerb & Soffen

[57] ABSTRACT

A dielectric ceramic composition consists essentially of $Pb(Ni_{1/3}Nb_{2/3})O_3$, $PbTiO_3$, $Pb(Zn_{1/2}W_{1/2})O_3$ and $Pb(Cu_{1/3}Nb_{2/3})O_3$, the mole percentages of said four components being as follows:

$Pb(Ni_{1/3}Nb_{2/3})O_3$—50.0 to 75.0 mole %
$PbTiO_3$—20.0 to 35.0 mole %
$Pb(Zn_{1/2}W_{1/2})O_3$—0.5 to 15.0 mole %
$Pb(Cu_{1/3}Nb_{2/3})O_3$—1.0 to 10.0 mole %

The dielectric ceramic composition may further contain, as an additive, manganese in an amount of not more than 0.5 mole % in terms of $MnO_2$. The composition possesses a high dielectric constant of not less than 8000 and a low sintering temperature of 900° to 1000° C.

3 Claims, No Drawings

DIELECTRIC CERAMIC COMPOSITION

BACKGROUND OF THE INVENTION

1. Field of the Invention

This invention relates to a dielectric ceramic composition and, more particularly, an improved dielectric ceramic composition with a high dielectric constant of not less than 8000 and a low sintering temperature of 900° to 1000° C.

2. Description of the Prior Art

Recently, electronic appliances for industrial and consumer uses have been required to be light-weight and compact and to have high quality and high operation frequencies. For this reason, there is an increasing demand for monolithic ceramic capacitors because of their large capacitance-to-volume ratio, high mass producibility and excellent electrical and physical characteristics including high frequency characteristics and heat resistance.

The monolithic ceramic capacitors are generally built up of an arrangement of alternating two layers of a dielectric layer, composed of a dielectric ceramic composition of a barium titanate system, and an internal electrode. The dielectric ceramic composition of the prior art has a high sintering temperature of 1300° to 1400° C., so that it has been required to use a noble metal such as Au, Pt and Pd as a material for internal electrodes. However, the noble metals are expensive to use and occupies the greater part of the manufacturing cost of the monolithic ceramic capacitors. Thus, the use of the noble metal sets a limit to lower the manufacturing cost of the monolithic ceramic capacitors.

To solve this problem, it has been proposed to incorporate a glass component comprising oxides of boron, bismuth and lead into the above modified barium titanate composition. The addition of the glass component lowers the sintering temperature to 1100° to 1150° C., thus making it possible to use a relatively inexpensive silver-paradium alloy as a material for internal electrodes. However, the incorporation of the glass component causes lowering of the dielectric constant, and thus the monolithic ceramic capacitors increase in size for a given capacitance. This results in increase in an amount of the electrode material to be used, thus making it difficult to reduce the manufacturing cost of the monolithic ceramic capacitors.

It is an object of the present invention to provide a dielectric ceramic composition with a high dielectric constant of not less than 8000 and a low sintering temperature of 900° to 1000° C.

Another object of the present invention is to provide a dielectric ceramic composition capable of being used as a dielectric material for monolithic ceramic capacitors comprising internal electrodes of a relatively inexpensive silver-paradium alloy.

SUMMARY OF THE INVENTION

According to the present invention there is provided a dielectric ceramic composition consisting essentially of $Pb(Ni_{\frac{1}{3}}Nb_{\frac{2}{3}})O_3$, $PbTiO_3$, $Pb(Zn_{\frac{1}{2}}W_{\frac{1}{2}})O_3$ and $Pb(Cu_{\frac{1}{3}}Nb_{\frac{2}{3}})O_3$, the mole percentages of said four components being as follows:

$Pb(Ni_{\frac{1}{3}}Nb_{\frac{2}{3}})O_3$—50.0 to 75.0 mole %
$PbTiO_3$'20.0 to 35.0 mole %
$Pb(Zn_{\frac{1}{2}}W_{\frac{1}{2}})O_3$—0.5 to 15.0 mole %
$Pb(Cu_{\frac{1}{3}}Nb_{\frac{2}{3}})O_3$—1.0 to 10.0 mole %

The dielectric ceramic composition of the above four component system may further contain, as an additive, manganese in an amount of not more than 0.5 mole % in terms of $MnO_2$ with respect to one mole of its basic composition consisting essentially of 50.0 to 75.0 mole % of $Pb(Ni_{\frac{1}{3}}Nb_{\frac{2}{3}})O_3$, 20.0 to 35.0 mole % of $PbTiO_3$, 0.5 to 15.0 mole % of $Pb(Zn_{\frac{1}{2}}W_{\frac{1}{2}})O_3$, and 1.0 to 0.0 mole % of $Pb(Cu_{\frac{1}{3}}Nb_{\frac{2}{3}})O_3$.

These and other objects, features and advantages of the present invention will be more apparent from the following description with reference to the preferred embodiments thereof.

DETAILED DESCRIPTION OF THE PREFERRED EMBODIMENTS

The dielectric ceramic composition of the present invention were produced in the following manner.

As starting raw materials there were used highly purified oxides (purity: not less than 99.9%) PbO, NiO, $Nb_2O_5$, $TiO_2$, ZnO, $WO_3$, CuO and $MnO_2$. These raw materials were weighed to prepare a mixture for the production of the final product having a composition with the compositional proportion shown in Table 1. Each of the resultant mixture (100 g) was wet milled in a polyethylene mill with agate balls for 10 hours. The resultant slurry was dried, placed in an alumina saggar, calcined at 650° to 800° C. for 2 hours, and then crushed to prepare powder of the primary reactant (calcined powder). The calcined powder was wet milled together with 3% by weight of polyvinyl alcohol incorporated therein as a binder, dried and then passed through a 50 mesh sieve screen. The thus obtained granulated powder was pressed into discs having a diameter of 12 mm and a thickness of 1.2 mm under a pressure of 2000 kg/cm$^2$ with an oil press. The discs were placed in a zirconia saggar and then fired at 900° to 1100° C. for 2 hours with an electric furnace in a lead-containing atmosphere.

Each of the resultant ceramic disc was provided on its both sides with silver electrodes by applying silver paste containing borosilicate glass frit and then baking the same at 750° C. for 10 minutes to prepare specimens for measurements of electrical properties.

The measurements were made on capacitance (C), dielectric loss (tan δ) and the insulation resistance (IR). The capacitance (C) and dielectric loss (tan δ) were measured at 1 KHz and 1 Vrms with an LCR meter, Model 4274 made by YOKOGAWA HEWLETT PACKARD CO. The insulation resistance was measured after applying a DC voltage of 500 V for 2 minutes with a megohom meter, Model TR 8601 made by TAKEDA RIKEN KOGYO CO. A thickness of the ceramic disc and a diameter of the opposed electrodes were measured to determine the dielectric constant (ε) and the specific resistance (ρ). Results are shown in Table 2.

In Tables 1 and 2, specimens with an asterisk (*) are those having a composition beyond the scope of the present invention, while other specimens are those included in the scope of the present invention.

TABLE 1

| Specimen No. | Basic Composition (mol %) | | | | Additive |
|---|---|---|---|---|---|
| | Pb(Ni$_{\frac{1}{3}}$Nb$_{\frac{2}{3}}$)O$_3$ | PbTiO$_3$ | Pb(Zn$_{\frac{1}{2}}$W$_{\frac{1}{2}}$)O$_3$ | Pb(Cu$_{\frac{1}{3}}$Nb$_{\frac{2}{3}}$)O$_3$ | MnO$_2$ (mol %) |
| 1* | 74 | 24 | 0 | 2.0 | 0 |
| 2 | 73.5 | 24 | 0.5 | 2.0 | 0 |
| 3 | 65 | 26 | 7.0 | 2.0 | 0 |
| 4 | 55 | 28 | 15.0 | 2.0 | 0 |
| 5* | 50 | 28 | 20.0 | 2.0 | 0 |
| 6* | 58 | 35 | 7.0 | 0 | 0 |
| 7 | 61 | 28 | 10 | 1.0 | 0 |
| 8 | 59 | 26 | 10 | 5.0 | 0 |
| 9 | 56 | 24 | 10 | 10 | 0 |
| 10* | 53 | 24 | 10 | 13 | 0 |
| 11* | 75 | 15 | 5.0 | 5.0 | 0 |
| 12 | 70 | 23 | 5.0 | 2.0 | 0 |
| 13* | 54 | 39 | 5.0 | 2.0 | 0 |
| 14* | 45 | 35 | 10 | 10 | 0 |
| 15* | 78 | 20 | 1.0 | 1.0 | 0 |
| 16 | 64.9 | 26 | 7.0 | 2.0 | 0.1 |
| 17 | 64.7 | 26 | 7.0 | 2.0 | 0.3 |
| 18 | 64.5 | 26 | 7.0 | 2.0 | 0.5 |
| 19* | 64 | 26 | 7.0 | 2.0 | 1.0 |
| 20 | 60.7 | 28 | 10 | 1.0 | 0.3 |
| 21 | 60.5 | 28 | 10 | 1.0 | 0.5 |
| 22* | 60.0 | 28 | 10 | 1.0 | 1.0 |

TABLE 2

| Specimen No. | Sintering Temp. (°C.) | $\epsilon$ | tan$\delta$ (%) | $\rho$($\Omega$-cm) At 25° C. | $\rho$($\Omega$-cm) At 85° C. |
|---|---|---|---|---|---|
| 1* | 1050 | 6,400 | 0.12 | $3.16 \times 10^{13}$ | $2.51 \times 10^{12}$ |
| 2 | 1000 | 8,900 | 0.37 | $1.58 \times 10^{12}$ | $3.29 \times 10^{11}$ |
| 3 | 950 | 14,300 | 0.74 | $2.39 \times 10^{12}$ | $5.01 \times 10^{11}$ |
| 4 | 900 | 10,800 | 1.00 | $6.31 \times 10^{11}$ | $7.88 \times 10^{10}$ |
| 5* | 900 | 6,100 | 1.27 | $1.40 \times 10^{9}$ | $7.92 \times 10^{7}$ |
| 6* | 1060 | 19,000 | 1.25 | $3.73 \times 10^{10}$ | $6.42 \times 10^{10}$ |
| 7 | 950 | 15,200 | 0.80 | $6.25 \times 10^{12}$ | $4.99 \times 10^{11}$ |
| 8 | 900 | 12,300 | 0.67 | $1.15 \times 10^{12}$ | $1.19 \times 10^{11}$ |
| 9 | 900 | 8,900 | 0.40 | $1.62 \times 10^{11}$ | $1.01 \times 10^{10}$ |
| 10* | 900 | 5,600 | 0.23 | $6.18 \times 10^{9}$ | $5.12 \times 10^{7}$ |
| 11* | 950 | 5,100 | 0.10 | $1.15 \times 10^{12}$ | $6.39 \times 10^{10}$ |
| 12 | 950 | 10,500 | 0.65 | $2.00 \times 10^{12}$ | $2.63 \times 10^{11}$ |
| 13* | 950 | 6,900 | 4.20 | $2.71 \times 10^{11}$ | $1.13 \times 10^{10}$ |
| 14* | 900 | 5,800 | 0.37 | $7.94 \times 10^{10}$ | $1.20 \times 10^{9}$ |
| 15* | 1100 | 3,400 | 0.10 | $3.08 \times 10^{13}$ | $7.97 \times 10^{12}$ |
| 16 | 950 | 14,000 | 0.56 | $1.07 \times 10^{13}$ | $2.38 \times 10^{12}$ |
| 17 | 950 | 13,700 | 0.47 | $1.43 \times 10^{13}$ | $5.07 \times 10^{12}$ |
| 18 | 950 | 10,400 | 0.31 | $1.24 \times 10^{13}$ | $2.45 \times 10^{12}$ |
| 19* | 950 | 6,100 | 1.25 | $3.21 \times 10^{10}$ | $1.71 \times 10^{8}$ |
| 20 | 950 | 14,200 | 0.66 | $3.98 \times 10^{13}$ | $1.60 \times 10^{12}$ |
| 21 | 950 | 10,700 | 0.70 | $3.33 \times 10^{13}$ | $1.30 \times 10^{13}$ |
| 22* | 950 | 7,000 | 2.80 | $1.66 \times 10^{10}$ | $1.08 \times 10^{9}$ |

From the results shown in Table 2, it is apparent that the dielectric ceramic composition according to the present invention has a high dielectric constant ($\epsilon$) of not less than 8000 and a low sintering temperature ranging from 900° to 1000° C.

In the present invention, the mole percentages of the four components, Pb(Ni$_{\frac{1}{3}}$Nb$_{\frac{2}{3}}$)O$_3$, PbTiO$_3$, Pb(Zn$_{\frac{1}{2}}$W$_{\frac{1}{2}}$)O$_3$ and Pb(Cu$_{\frac{1}{3}}$Nb$_{\frac{2}{3}}$)O$_3$ are limited to the ranges as defined above for the following reasons.

Firstly, if the content of Pb(Ni$_{\frac{1}{3}}$Nb$_{\frac{2}{3}}$)O$_3$ is less than 50 mole %, the dielectric constant becomes low and less than 8000 and the resultant dielectric ceramic compositions can not be put into practical use since they exhibit electrical characteristics equal to or less than those of the barium titanate compositions of the prior art. If the content of the content of Pb(Ni$_{\frac{1}{3}}$Nb$_{\frac{2}{3}}$)O$_3$ is greater than 75.0 mole %, the sintering temperature becomes higher than 1000° C. and the dielectric constant becomes extremely low.

Secondary, if the content of PbTiO$_3$ is less than 20.0 mole % or greater than 35.0 mole %, the dielectric constant lowers to less than 8000.

Thirdly, if the content of Pb(Zn$_{\frac{1}{2}}$W$_{\frac{1}{2}}$)O$_3$ is less than 0.5 mole %, the sintering temperature become higher than 1000° C. If such a composition is sintered at a temperature of less than 1000° C., the product exhibits low density and low dielectric constant less than 8000. If the content of Pb(Zn$_{\frac{1}{2}}$W$_{\frac{1}{2}}$)O$_3$ is greater than 15 mole %, the dielectric constant becomes less than 8000 and the specific resistance is low even though the sintering temperature becomes less than 1000° C.

If the content of Pb(Cu$_{\frac{1}{3}}$Nb$_{\frac{2}{3}}$)O$_3$ is less than 1.0 mole &, the dielectric constant is high, but the sintering temperature becomes higher than 1000° C. If the content of Pb(Cu$_{\frac{1}{3}}$Nb$_{\frac{2}{3}}$)O$_3$ is greater than 10.0 mole %, the composition exhibits good sintering properties, but its dielectric constant becomes less than 8000 and the specific resistance lowers.

The added amount of manganese is limited to the above range for the following reasons. If the added amount of Mn is greater than 0.5 mole % in terms of MnO$_2$ with respect to one mole of the basic composition of the four component system, the dielectric constant becomes less than 8000, and the specific resistance lowers to less than $10^{11}$ $\Omega$-cm.

The dielectric ceramic composition of the present invention has excellent electrical and physical properties. They include, (1) a high dielectric constant ($\epsilon$) of not less than 8000
(2) a low dielectric loss (tan $\delta$) of not more than 2.5%
(3) a high specific resistance of not less than $10^{11}$ $\Omega$-cm at room temperature.
(4) a low sintering temperature of 900° to 1000° C.
(5) The specific resistances at room temperature and an elevated temperature (85° C.) may be further increased by incorporation of a specific amount of Mn. In this case, it is possible to obtain the specific resistance at room temperature of not less than $10^{13}$ $\Omega$cm.

Accordingly, the dielectric ceramic composition of the present invention can be used as a dielectric material not only for fixed ceramic capacitors but also for monolithic ceramic capacitors. The dielectric ceramic composition of the present invention has a low sintering temperature, thus making it possible to use a relatively inexpensive silver-paradium alloy as a material for internal electrodes of monolithic ceramic capacitors. Accordingly, it is possible to manufacture monolithic ceramic capacitors with a large capacitance-to-volume ratio at a low cost.

What is claimed is:

1. A dielectric ceramic composition consisting essentially of $Pb(Ni_{\frac{1}{3}}Nb_{\frac{2}{3}})O_3$, $PbTiO_3$, $Pb(Zn_{\frac{1}{2}}W_{\frac{1}{2}})O_3$ and $Pb(Cu_{\frac{1}{3}}Nb_{\frac{2}{3}})O_3$, the mole percentages of said four components being as follows:

$Pb(Ni_{\frac{1}{3}}Nb_{\frac{2}{3}})O_3$—50.0 to 75.0 mole %
$PbTiO_3$—20.0 to 35.0 mole %
$Pb(Zn_{\frac{1}{2}}W_{\frac{1}{2}})O_3$—0.5 to 15.0 mole %
$Pb(Cu_{\frac{1}{3}}Nb_{\frac{2}{3}})O_3$—1.0 to 10.0 mole %

2. The dielectric ceramic composition according to claim 1 further containing, as an additive, manganese in an amount of not more than 0.5 mole % in terms of $MnO_2$ with respect to one mole of the basic composition consisting of 50.0 to 75.0 mole % of $Pb(Ni_{\frac{1}{3}}Nb_{\frac{2}{3}})O_3$, 20.0 to 35.0 mole % of $PbTiO_3$, 0.5 to 15.0 mole % of $Pb(Zn_{\frac{1}{2}}W_{\frac{1}{2}})O_3$ and 1.0 to 10.0 mole % of $Pb(Cu_{\frac{1}{3}}Nb_{\frac{2}{3}})O_3$.

3. The dielectric ceramic composition according to claim 1 wherein the composition has a high dielectric constant of not less than 8000 and a low sintering temperature ranging from 900° to 1000° C.

* * * * *